United States Patent [19]

Rose et al.

[11] Patent Number: 4,613,294
[45] Date of Patent: Sep. 23, 1986

[54] ROTARY CHEESE MOLDER WITH IMPROVED COOLING

[75] Inventors: Scott J. Rose, Columbus; Rodney J. Huettner; George H. Hall, both of Beaver Dam, all of Wis.

[73] Assignee: Stainless Steel Fabricating, Inc., Columbus, Wis.

[21] Appl. No.: 760,323

[22] Filed: Jul. 29, 1985

[51] Int. Cl.$^4$ ............ A23C 3/04; B29C 31/04
[52] U.S. Cl. .................. 425/438; 99/455; 425/259; 425/444
[58] Field of Search .......... 425/258, 259, 348 R, 425/350, 351, 361, 447, 434, 449, 261, 441, 444, 453, 148, 438; 99/455

[56] References Cited

U.S. PATENT DOCUMENTS

| | | | |
|---|---|---|---|
| 2,375,955 | 5/1945 | Smith | 425/543 |
| 2,840,909 | 7/1958 | Dzenis | 425/208 |
| 3,047,951 | 8/1962 | Le Boenf | 425/261 |
| 3,101,540 | 8/1963 | Dzenis | 425/200 |
| 3,421,220 | 1/1969 | Stanga | 425/86 |
| 3,633,245 | 1/1972 | Partos | 425/259 |
| 3,956,516 | 5/1976 | Holt et al. | 425/361 |
| 4,112,835 | 9/1978 | Mongiello | 99/455 |
| 4,248,578 | 2/1981 | Worden | 425/220 |

OTHER PUBLICATIONS

*Dairy Record,* Feb. 1984, cover page, published by Gorman Publishing Co., Chicago, IL 60631.
Paper No. 1974-4, Dr. Augusto Balducci, Proceedings, from the 11th Annual Marschall Invitational Italian Cheese Seminar, May 6, 1974.
"CMC 5000 Continuous Molder-Chiller" brochure, published by Stainless Steel Fabricating, Inc. (the assignee of this patent application), Admitted Prior Art.
"CMT Continuous Pasta Filata Stretcher-Moulder", published by D. Tomatis S. & C. s.a.s., via Provinciale 141/A 12010 S. Lorenzo di Peveragno (Cuneo) Admitted Prior Art.

*Primary Examiner*—Willard E. Hoag
*Attorney, Agent, or Firm*—Quarles & Brady

[57] ABSTRACT

A rotary cheese molder especially adapted for consumer size cheese pieces is disclosed. The molder includes a stationary cooling head having enclosed sides and a bottom wall with a fill opening and a discharge opening. A mold body is rotationally driven within the head and includes an upper plate and a lower plate. Two circular rows of mold sleeves extend between the upper and lower plates. The mold sleeves overlap the fill and discharge openings so that cheese can fill the sleeves and be discharged therefrom. A mold plunger in each of the mold sleeves determines the size and shape of the cheese pieces and cams along a discharge ramp to eject the cheese pieces from the molder. A manifold pipe around the periphery of the mold body and a central pipe which extends into the central portion of the mold body spray cooling liquid onto the sleeves between the upper and lower plates. The cooling liquid cools the cheese pieces in the sleeves before the cheese pieces reach the discharge opening to facilitate discharge of the cheese pieces from the sleeves and to help retain the shape of the cheese pieces after ejection from the sleeves.

8 Claims, 7 Drawing Figures

4,613,294

ROTARY CHEESE MOLDER WITH IMPROVED COOLING

BACKGROUND OF THE INVENTION

This invention relates to cheese molding machines and in particular to an automatic cheese molding machine for forming consumer size cheese pieces.

Consumer size cheese pieces of distinctive shapes have become popular in recent years. Hand forming the massive amounts demanded has become impractical or too expensive. Moreover, the automatic machines that have been devised to mold consumer size cheese pieces have been not totally successful or were very complicated and expensive.

SUMMARY OF THE INVENTION

The invention provides a rotary cheese molder specially adapted for consumer size cheese pieces. The molder includes a stationary cooling head having enclosed sides and a bottom wall with a fill opening and a discharge opening. A mold body is disposed within the cooling head and includes an upper plate and a lower plate. A plurality of mold sleeves extend between the upper and lower plates and are arranged in a circular pattern. The circular pattern overlaps the fill and discharge openings so that cheese can fill the sleeves and be discharged therefrom. The mold body is driven rotationally to move the sleeves in succession over the fill and discharge openings. A manifold pipe around the periphery of the mold body directs cooling spray to the sleeves between the upper and lower plates. Also, a central pipe extends into the central portion of the mold body and directs cooling spray to the sleeves between the upper and lower plates. Especially for smaller, consumer size cheese pieces, the cooling spray partially solidifies the cheese in the sleeves before the cheese reaches the discharge opening. This provides the cheese pieces with a stiff skin to facilitate discharge of the cheese pieces from the sleeves and to help the cheese pieces retain their shape after they are discharged.

In another aspect, a plurality of mold plungers with each mold plunger received in one of the mold sleeves is provided. Each plunger has a stainless steel upper portion into the top of which a tare weight adjusting screw is threaded. A plastic lower portion is connected to the upper portion and a desired shape is formed in the bottom of the lower portion. A vent passageway provides communication between the top of the upper portion and the top of the shape formed in the lower portion to allow cheese to completely fill the shape in the lower portion. A stop plate is positioned over the fill opening to contact the tare weight adjusting screw as the mold sleeve is filling to limit the size of the cheese piece. By making the plunger in two pieces, only the plastic lower portion need be changed to produce cheese pieces of different shapes. Also, the plastic lower portion can be easily replaced when it becomes excessively worn.

In another aspect, the rotary cheese molder further comprises a discharge plate over the discharge opening which provides a downwardly sloping surface in the direction of rotation of the mold body. The tare weight adjusting screw contacts the discharge plate to eject the cheese piece from the sleeve as the mold body rotates.

In yet another aspect, the sides of the cooling head are circular cylindrical and the upper plate of the mold body is circular of a diameter nearly as large as the inside diameter of the head. This keeps water from splashing out of the head thereby obviating a cover plate for the head. The lower plate of the mold body is smaller than the inside diameter of the cooling head and the bottom of the head forms a trough around its circumferential periphery radially outward from the lower plate to collect cooling liquid as it runs off from the mold body. A reservoir tank can be provided in communication with the trough to collect cooling liquid and provide a reserve of cooling liquid to be pumped through the manifold and central pipes. Preferably, the discharge opening is spaced as far away from the fill opening in the direction of rotation of the mold body as possible to allow the cheese pieces in the sleeves as much time as possible to cool.

It is therefore a principal object of the invention to provide an automatic rotary cheese molder which facilitates ejection of cheese pieces from the molder and which produces consumer size cheese pieces which maintain their shape after they are ejected.

It is another object of the invention to provide an automatic rotary cheese molder with improved control over the size and shape of cheese pieces produced by the molder.

It is another object of the invention to provide an automatic rotary cheese molder with a simple and effective means of discharging cheese pieces from the molder.

It is another object of the invention to provide a rotary cheese molder having a simple and effective coolant distribution system.

These and other objects and advantages of the invention will become apparent from the following detailed description and from the drawings.

DETAILED DESCRIPTION OF THE PREFERRED EMBODIMENT

Figure 1:
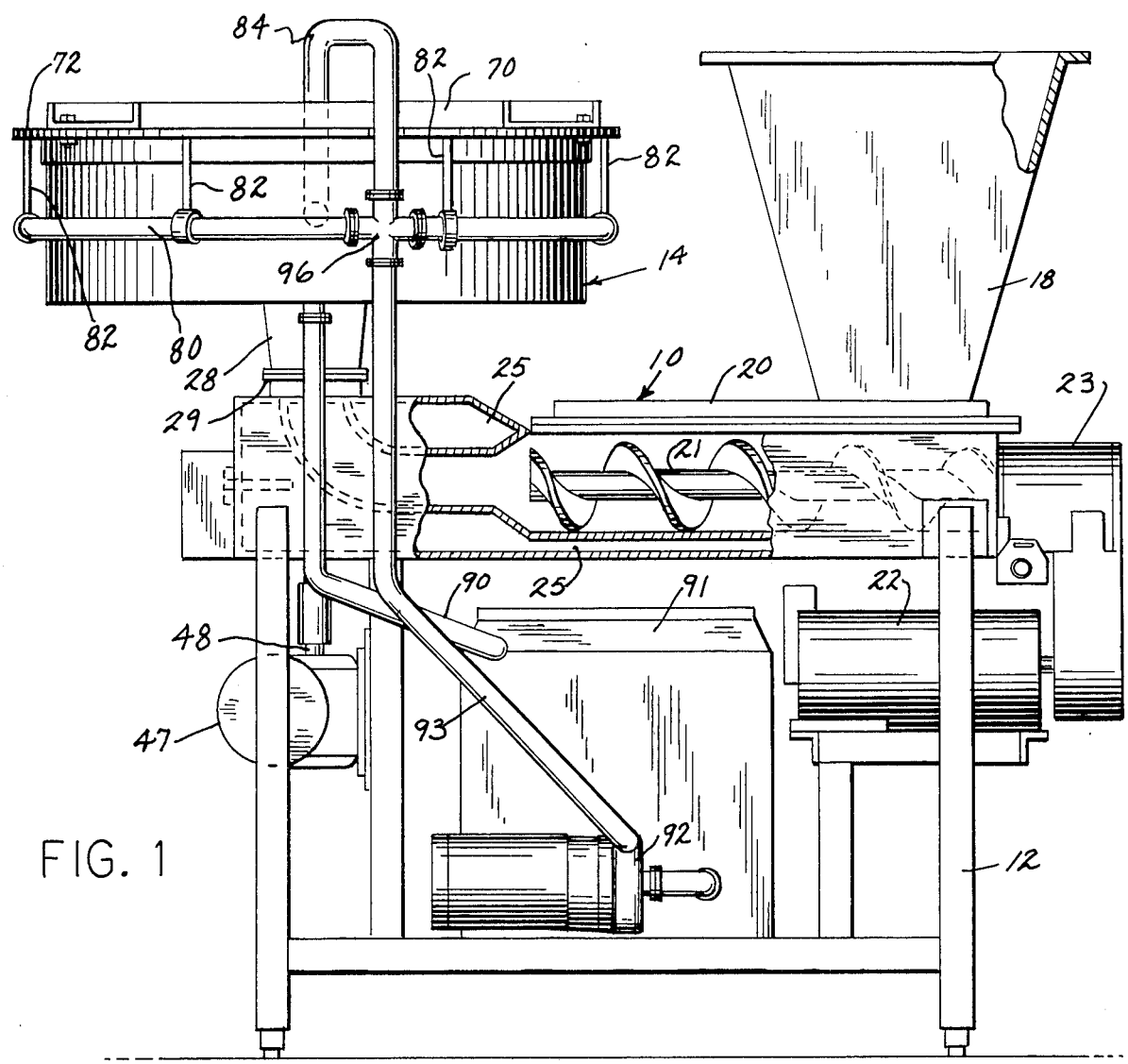
FIG. 1 is a side elevation view of a rotary cheese molder with portions broken away of the present invention.
Figure 2:
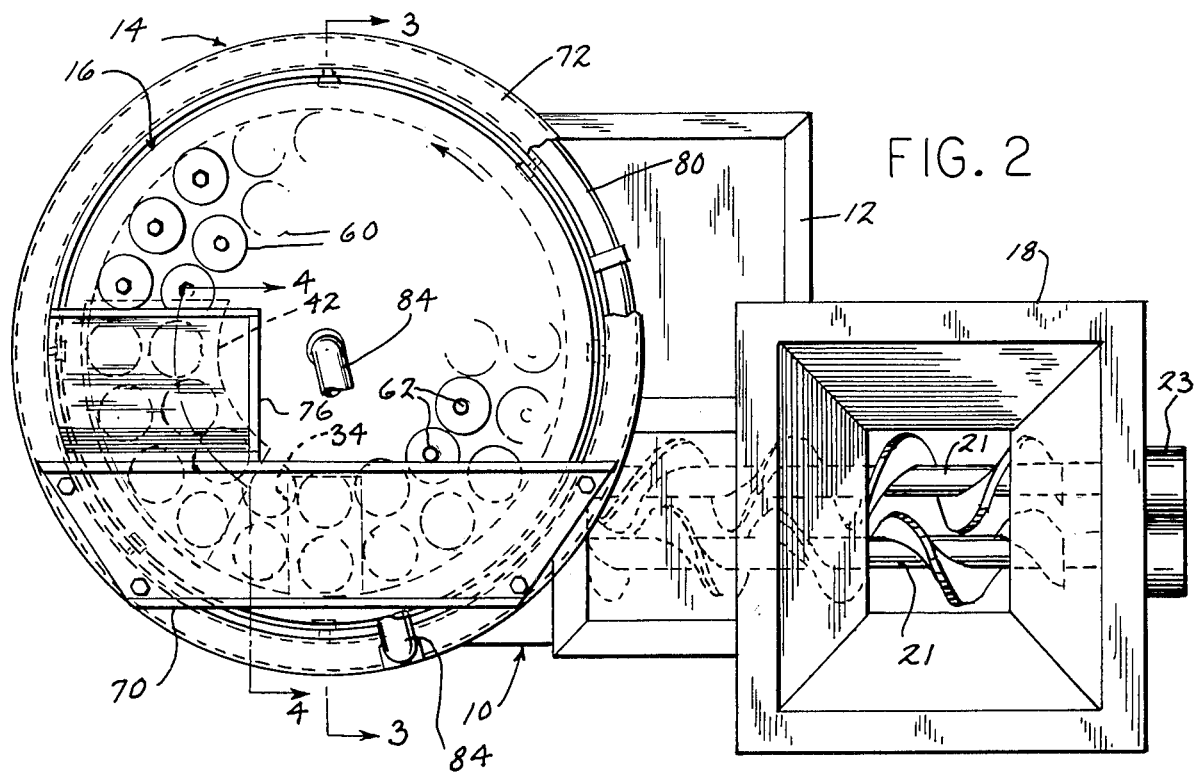
FIG. 2 is a top plan view of the rotary cheese molder of FIG. 1.

FIGS. 1 and 2 show a rotary cheese molder of the present invention. An extruder 10 is mounted on a frame 12 to deliver plastic fluid cheese to a cooling head 14. A mold body 16 is driven rotationally within the head 14 to fill a plurality of molds included within the mold body 16 with cheese. The molds are then cooled with a cooling liquid sprayed on the mold body 16 and are ejected from the cooling head 14.

The extruder 10 includes a hopper 18 and a housing 20 to which the lower end of the hopper is mounted. Within the housing 20 are a pair of counter-rotating augers 21 which are rotatably driven by a variable speed electric motor 22 through suitable gearing in casing 23. The housing 20 preferably includes a water jacket 25 which is surrounded by water warmed by a heating element 26 and has its cheese-contacting surfaces coated with a lubricious material such as that sold under the trade designation Ultralon by I.C.I. Americas, Wilmington, Del. 19897. An extruder 10 suitable for use with the present invention is commercially available from the assignee of this invention, Stainless Steel Fabricating, Inc., Columbus, Wis. 53925.

The hopper 18 is filled with cheese curd. As the augers 21 counter-rotate, they knead the cheese thereby cementing the curd into a cheese mass. In addition to heat transfer from the warm water in the water jacket 25, the cheese mass is heated by friction which occurs during the kneading process. The cheese mass thereby emerges from the auger section of the housing 20 as a warm plastic fluid.

Figure 3:
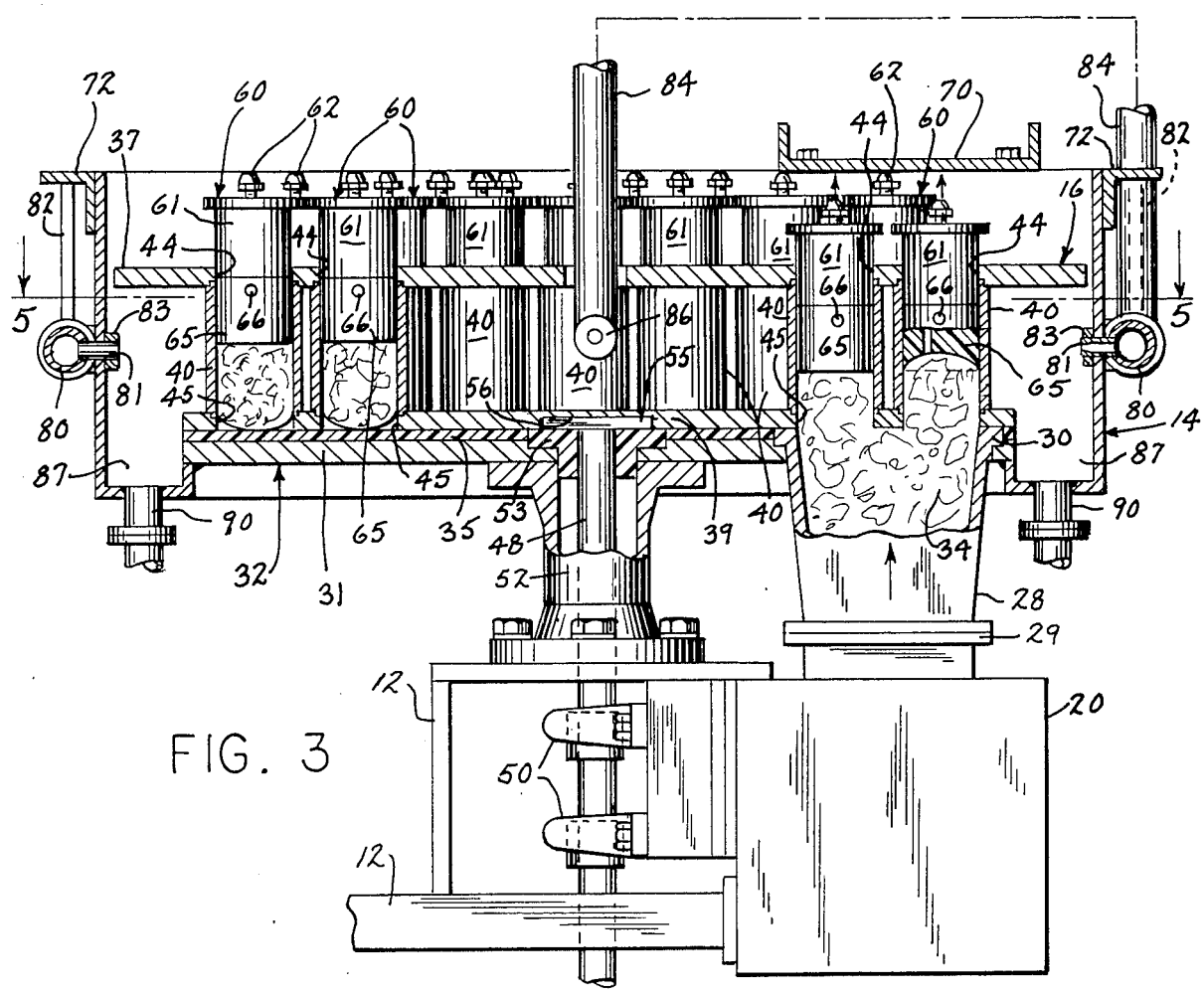
FIG. 3 is a sectional view taken along the plane of the line 3—3 of FIG. 2.
Figure 5:
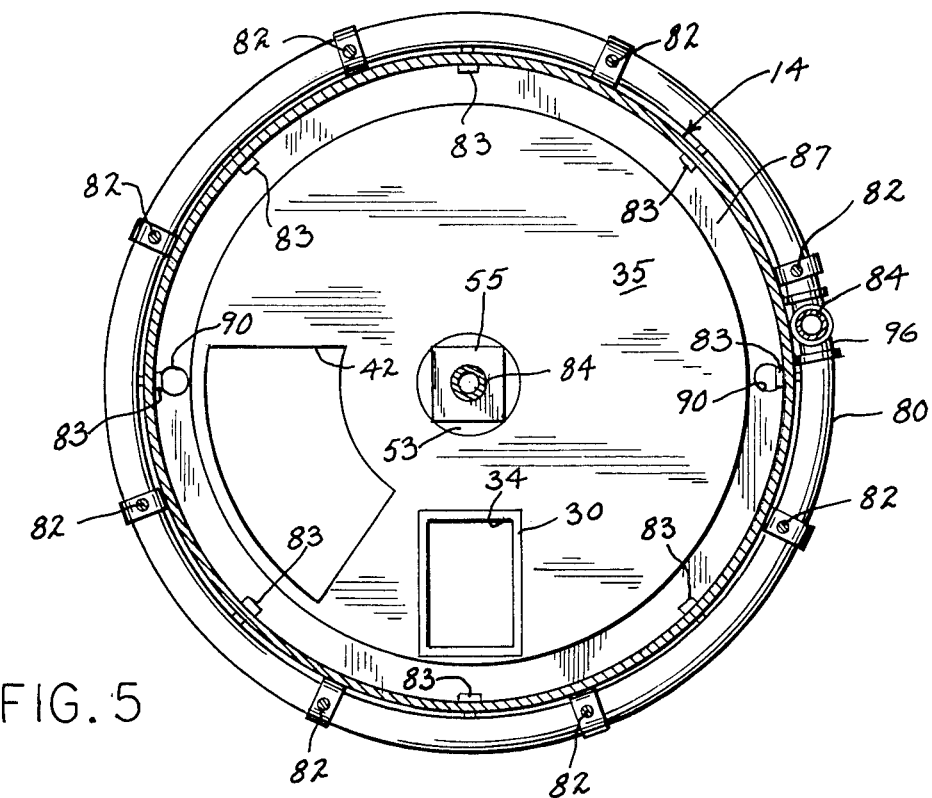
FIG. 5 is a sectional view of a cooling head for the rotary cheese molder taken along the plane of the line 5—5 of FIG. 3 and shown without a mold body therein.

The warm plastic fluid cheese is delivered from the housing 20 to a filler neck 28 which is rigidly connected to an outlet 29 of the housing 20. Referring to FIGS. 3 and 5, the filler neck 28 has a flange 30 at its upper end which is recessed into a plate 31 of a bottom wall 32 of the cooling head 14. The filler neck 28 is laterally offset from the center of the cooling head 14 and provides a transition from the circular outlet 29 to a rectangular fill opening 34 (FIG. 2) where the filler neck 28 opens into the head 14. Also, surrounding the filler neck 28 above the plate 31 and substantially coextensive with the plate 31 is a polytetrafluoroethylene gasket pad 35 which is flush with the top of the flange 30.

The mold body 16 rests on top of the gasket pad 35. The mold body includes an upper plate 37 and a co-axial lower plate 39 which is spaced a distance beneath the upper plate 37. A plurality of vertically oriented mold sleeves 40 extend between and are recessed into the plates 37 and 39. The sleeves 40 are arranged in a circular pattern of two rows which overlap the fill opening 34 and a discharge opening 42. Openings 44 and 45 in the upper 37 and lower 39 plates, respectively, provide communication through the sleeves from the top to the bottom of the mold body 16. Preferably, the mold sleeves, 40 and openings 44 and 45 are coated with a lubricious material such as that sold under the trade designation Ultralon referred to above.

The mold body 16 is rotationally driven continuously by a variable speed electric motor 47 (FIG. 1). A shaft 48 extends through two pillow block bearings 50, a hollow mounting column 52 and an ultra-high molecular weight plastic bushing 53. The shaft 48 has a square flange 55 (FIG. 5) which fits into a square recess 56 at the center of the plate 39 to provide a driving connection between the shaft 48 and the mold body 16. The mounting column 52 has lower and upper flanges which are bolted or otherwise securely attached to the flame 12 and plate 31, respectively to support the head 14 on the frame 12. The top of the bushing 53 is flush with the top of the gasket pad 35.

Figures 6, 7:
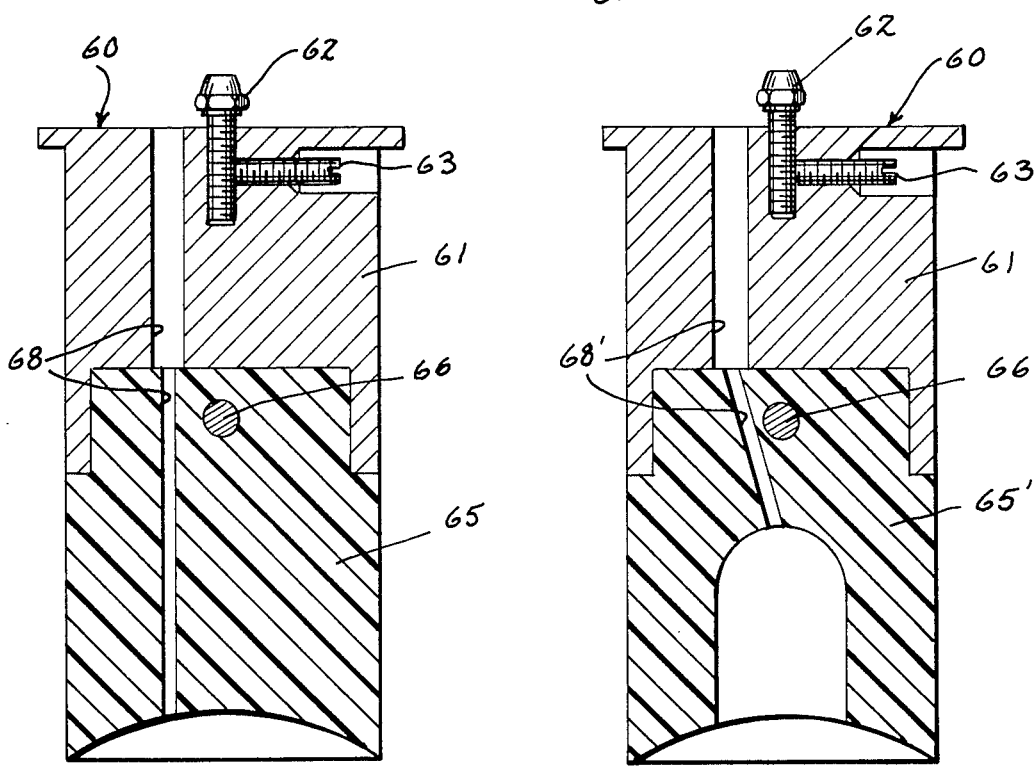
FIG. 6 is a detail sectional view of one of the mold plungers shown in FIGS. 3 and 4.
FIG. 7 is a detail view of an alternate embodiment of a mold plunger.

As cheese is extruded out the outlet 29, it enters the filler neck 28 and exits the filler neck 28 into the sleeves 40 which are above the filler neck 28. To provide a particular size and shape of the cheese piece produced in each sleeve 40, a mold plunger 60 is slidably received in each of the sleeve 40. Each mold plunger 60 has a stainless steel upper portion 61 into the top of which a tare weight adjusting screw 62 is threaded. Referring to FIG. 6, a locking bolt 63 is threaded into the side of the upper portion 61 to bear against the tare weight adjusting screw 62 to lock the adjusting screw 62 in position.

The bottom of the upper portion 61 is recessed to closely receive a plastic lower portion 65. A pin 66 extends through the plastic portion 65 and the stainless steel portion 61 to secure the plastic portion 65 in the recess.

Figure 4:
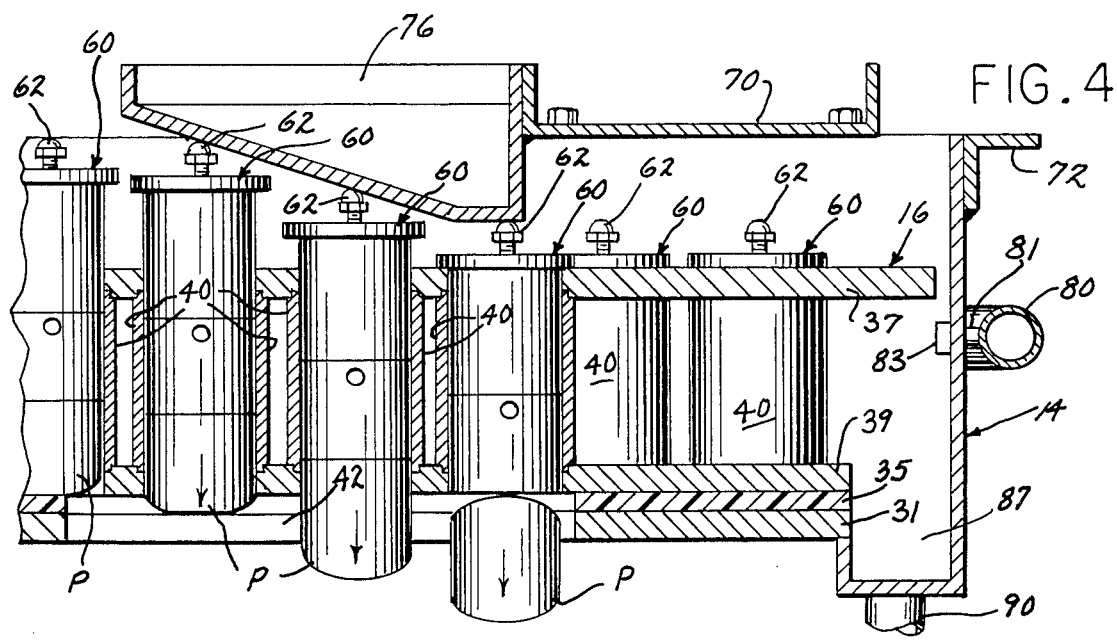
FIG. 4 is a view taken along the line 4—4 of FIG. 2.

The bottom of the plastic lower portion 65 is recessed in a desired shape to produce a particular shape of the cheese piece. For example, the lower portion 65 of FIG. 6 would produce a generally round piece and the lower portion 65' of FIG. 6 would produce a scamorze or generally pear-shaped piece. Note that the bottoms of the pieces P are rounded (FIG. 4) due to a rolling action that takes place as the cheese in the molds drags on the gasket pad 35.

Vent passageways 68 and 68' provide communication between the tops of the recesses in the respective lower portions 65 and 65' and the tops of the upper portions 61 to allow air to escape from the recess as it is filled with cheese.

A stop plate 70 spans the head over the fill opening 34 and is bolted to a flange 72 which is welded to the head 14. As a sleeve 40 over a fill opening 34 fills, the plunger 60 in the sleeve rises until the top of the tare-weight adjusting screw 62 abuts the stop plate 70. At that time, the sleeve stops filling and the cheese coming up through the fill opening 34 simply flows into a different sleeve 40 which is over or partially over the opening 34 but which has not been filled. As the filled sleeve 40 passes by the fill opening 34, the cheese entering the sleeve 40 is sheared off.

For a large range of adjustment of the size of the cheese piece, an adjustable stop (not shown) is preferred which can be added over the fill opening 34. This can be threaded through the stop plate 70 with an acme thread and have a plate at its lower end for abutting the tareweight adjusting screws and a knurled knob at its upper end for adjustment by the operator. Since the adjustable stop would extend below the stop plate 70, it may be necessary to raise the stop plate 70 above the top of the head 14. This can be done by simply mounting it to the flange 72 with studs, each having an enlarged diameter between the stop plate 70 and the flange 72 and with threaded ends extending through the stop plate 70 and flange 72, respectively.

The discharge opening 42 is spaced an angular distance as far as possible away from the fill opening 34 in the direction of rotation of the mold body 16 to provide maximum cooling of the cheese pieces before they are ejected. Over the discharge opening 42 is a discharge ramp 76 which is rigidly secured to the stop plate 70 and/or the head 14. The discharge ramp 76 slopes downwardly in the direction of rotation of the mold body 16 so that as the mold body 16 rotates, the tops of the tare weight adjusting screws 62 contact and slide along the discharge ramp 76. This urges the plungers 60 downwardly to eject the cheese pieces through the discharge opening 42. The cheese pieces then usually fall into a water or brine tank provided by the user of the invention.

To facilitate ejection of the cheese pieces and to maintain the shape of the cheese pieces after they are ejected, the sleeves 40 are cooled between the fill opening 34 and the discharge opening 42 as they travel around in the head 14. Cooling is accomplished in part by a manifold pipe 80 which surrounds the head 14 and is supported by extensions 82 which depend from the flange 72 and are secured to the pipe 80. Nozzles 81 extend through the side wall of the head 14 and are secured thereto by threaded collars 83. The nozzles 81 provide communication between the pipe 80 and the interior of the head 14 to spray cooling liquid, such as brine or water, on the sleeves 40 between the upper and lower plates 37 and 39. The cooling provided by the manifold pipe 80 is most effective to cool the radially outer row of sleeves 40 and the outer side surfaces of the radially inner row of sleeves 40.

Cooling is also accomplished by a central pipe 84 which extends up over the head 14 and down into the center of the mold body 16. The central pipe 84 has a whirling nozzle 86 at its end which sprays cooling liquid on the sleeves 40 between the upper and lower plates 37 and 39. The whirling nozzle 86 uniformly distributes cooling liquid over the mold sleeves 40, and is most effective to cool the radially inner row of sleeves 40 and the inner side surfaces of the outer row of sleeves 40. A whirling nozzle 86 suitable to be incorporated in the invention is commercially available from Spraco, Nashua, N.H. 03061.

The construction of the mold body 16 with discrete mold sleeves 40 and with cooling liquid being sprayed continuously over the mold sleeves provides for effective cooling of the cheese pieces. As each sleeve 40 is relatively thin walled and made of heat conductive material, preferably stainless steel (as are the other metal parts of the cheese molder), good heat transfer takes place between the cheese piece and the cooling liquid. This provides the cheese piece with a relatively stiff skin which facilitates ejection of the cheese piece from the mold sleeve and helps maintain the shape of the piece after it is ejected. Cooling in this manner is especially effective for consumer size cheese pieces, which are generally in the range of about 4–20 ounces.

The side wall of the head 14 is circular cylindrical and the upper plate 37 of the mold body 16 is circular of a diameter nearly as large as the inside diameter of the head 14. This keeps water from splashing outside the head 14. The lower plate 39 of the mold body 16 is smaller than the inside diameter of the head 14, being approximately the diameter of the plate 31 and pad 35 of the head 14. The bottom of the head 14 forms a trough 87 around its circumferential periphery radially outward from the lower plate 39 to collect cooling liquid as it runs off the mold body 16.

A pair of return pipes 90, one on each side of the head 14, communicates with the trough 87 to return cooling liquid from the trough to a reservoir tank 91. The reservoir tank 91 provides a reserve of cooling liquid to a pump 92 which circulates the cooling liquid through a delivery pipe 93 to the manifold pipe 80 and central pipe 84. An X-coupling 96 connects the delivery pipe 93, manifold pipe 80 and central pipe 84. Preferably, the cooling liquid in the reservoir tank 91 is cooled by a remote cooling means (not shown), which can be readily provided by the user of the invention.

As the mold body 16 rotates and is filling, the weight of the mold body may not be sufficient to hold the mold body down against the gasket pad 35. To counteract the tendency of the mold body to float up, appreciate hold-downs (not shown) can easily be added to the molder. These can preferably be in the form of rotary wheels which roll on and apply a downward force to the periphery of the upper plate 37 of the mold body 16. Under most circumstances, three such wheel spaced at equal intervals around the head 14 will be sufficient. Each wheel can be stationarily mounted to the head 14 by being mounted on the lower end of a threaded stud.

The threaded stud is screwed into appropriately spaced channels which span the head 14 in the same manner that the stop plate 70 spans the head 14.

Various modifications and variations to the preferred embodiment will be apparent to those skilled in the art but which will still embody the spirit of the invention. Therefore, the invention is not intended to be limited by the scope of the preferred embodiment, but only by the claims which follow, except as otherwise required by law.

We claim:

1. A rotary cheese molder for consumer size cheese pieces, comprising:
   a stationary cooling head having enclosed sides and a bottom wall, said bottom wall having a fill opening and a discharge opening;
   a mold body within the stationary head, said mold body including:
      an upper plate;
      a lower plate spaced beneath the upper plate, said upper and lower plates having a common vertical axis;
      a plurality of vertically oriented mold sleeves, each of said sleeves extending between the upper and lower plates and being arranged in a circular pattern which overlaps the fill and discharge openings; and
      wherein the lower and upper plates have openings to provide communication through the sleeves from the bottom of the mold body to the top;
   means for rotationally driving the mold body to move the sleeves in succession over the fill and discharge openings;
   an extruder for delivering warm plastic fluid cheese to the fill opening to fill the mold sleeves as they pass over the fill opening;
   a manifold pipe around the periphery of the mold body to spray cooling liquid on the sleeves between the upper and lower plates;
   a central pipe extending into the central portion of the mold body to spray cooling liquid on the sleeves between the upper and lower plates; and
   means for pumping the cooling liquid through the manifold and central pipes; and
   wherein the cooling liquid partially cools the cheese in the sleeves before the cheese reaches the discharge opening and collects in the cooling head to be recirculated through the manifold and central pipes by the pumping means.

2. A rotary cheese molder as in claim 1, further comprising:
   a plurality of mold plungers, each said plunger being slidably received in one of the mold sleeves and including:
      a stainless steel upper portion into the top of which a tare weight adjusting screw is threaded; and
      a plastic lower portion connected to the upper portion into the bottom of which a desired shape is formed; and
      wherein a vent passageway provides communication between the top of the upper portion and the top of the shape formed in the lower portion; and
      a stop plate over the fill opening to contact the tare weight adjusting screw when the mold sleeve is full to limit the size of the cheese piece.

3. A rotary cheese molder as in claim 2, further comprising a discharge ramp over the discharge opening which provides a downwardly sloping surface in the direction of rotation of the mold body which the tare weight adjusting screws contact to eject the cheese pieces from the sleeves and out of the discharging opening.

4. A rotary cheese molder as in claim 1, wherein:
the sides of the cooling head are circular cylindrical;
the upper plate of the mold body is circular of a diameter nearly as large as the inside diameter of the cooling head; and
the lower plate of the mold body is smaller than the inside diameter of the cooling head; and
wherein the bottom of the cooling head forms a trough around its circumferential periphery radially outward from the lower plate to collect cooling liquid as it runs off the mold body.

5. A rotary cheese molder as in claim 1, wherein the central pipe has a whirling nozzle at its end within the mold body to uniformly distribute cooling liquid over the mold sleeves.

6. A rotary cheese molder as in claim 1, further comprising a reservoir tank in communication with the cooling head to collect cooling liquid from the head and provide a reserve of cooling liquid to be pumped through the manifold and central pipes.

7. A rotary cheese molder as in claim 1, wherein the discharge opening is spaced as far away from the fill opening in the direction of rotation of the mold body as possible.

8. A rotary cheese molder as in claim 1, wherein the sleeves are arranged in two circular rows, one being a radially inner row and the other being a radially outer row.

* * * * *